United States Patent
Liang

(10) Patent No.: US 11,729,236 B2
(45) Date of Patent: Aug. 15, 2023

(54) SAMPLING RATE PROCESSING METHOD, APPARATUS, AND SYSTEM, STORAGE MEDIUM, AND COMPUTER DEVICE

(71) Applicant: Tencent Technology (Shenzhen) Company Limited, Shenzhen (CN)

(72) Inventor: Junbin Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 86 days.

(21) Appl. No.: 17/518,454

(22) Filed: Nov. 3, 2021

(65) Prior Publication Data
US 2022/0060531 A1 Feb. 24, 2022

Related U.S. Application Data

(63) Continuation of application No. PCT/CN2020/120387, filed on Oct. 12, 2020.

(30) Foreign Application Priority Data

Dec. 19, 2019 (CN) .......................... 201911317463.X

(51) Int. Cl.
*G10L 15/00* (2013.01)
*H04L 65/70* (2022.01)
(Continued)

(52) U.S. Cl.
CPC .............. *H04L 65/70* (2022.05); *G10L 19/02* (2013.01); *G10L 21/055* (2013.01); *G10L 25/21* (2013.01); *H04L 65/75* (2022.05); *H04L 65/80* (2013.01)

(58) Field of Classification Search
None
See application file for complete search history.

(56) References Cited

U.S. PATENT DOCUMENTS

| 2006/0034481 A1* | 2/2006 | Barzegar ................. H04L 65/80 381/401 |
| 2014/0177871 A1* | 6/2014 | Morton ..................... H04R 3/04 381/99 |
| 2018/0039474 A1* | 2/2018 | Shih ......................... G06F 3/165 |

FOREIGN PATENT DOCUMENTS

| CN | 1151077 A | 6/1997 |
| CN | 101719966 A | 6/2010 |

(Continued)

OTHER PUBLICATIONS

Extended European Search Report, EP20902980.0, dated Jul. 29, 2022, 6 pgs.

(Continued)

*Primary Examiner* — Bhavesh M Mehta
*Assistant Examiner* — Uthej Kunamneni
(74) *Attorney, Agent, or Firm* — Morgan, Lewis & Bockius LLP

(57) ABSTRACT

A sampling rate processing method performed by a computer device are disclosed. The method includes: obtaining a first audio signal recorded by a transmitting device, the first audio signal being recorded according to an initial sampling rate of the transmitting device; obtaining a second audio signal recorded by a receiving device during playing of the first audio signal, the second audio signal being recorded according to the initial sampling rate; determining a frequency response gain value of the receiving device according to a power spectrum of the first audio signal and a power spectrum of the second audio signal; determining a target sampling rate of the transmitting device according to the initial sampling rate and the frequency response gain value; and configuring the transmitting device to record audio signals according to the target sampling rate.

20 Claims, 6 Drawing Sheets

(51) Int. Cl.
*G10L 19/02* (2013.01)
*G10L 21/055* (2013.01)
*G10L 25/21* (2013.01)
*H04L 65/80* (2022.01)
*H04L 65/75* (2022.01)

(56) References Cited

FOREIGN PATENT DOCUMENTS

| | | | |
|---|---|---|---|
| CN | 103354588 | A | 10/2013 |
| CN | 103686311 | A | 3/2014 |
| CN | 103747407 | A | 4/2014 |
| CN | 103812754 | A | 5/2014 |
| CN | 104244161 | A | 12/2014 |
| CN | 104254007 | A | 12/2014 |
| CN | 104464764 | A | 3/2015 |
| CN | 106205651 | A | 12/2016 |
| CN | 107886975 | A | 4/2018 |
| CN | 109448676 | A | 3/2019 |
| CN | 109525873 | A | 3/2019 |
| DE | 60011182 | T2 | 10/2004 |
| EP | 0896498 | A2 | 2/1999 |

OTHER PUBLICATIONS

Tencent Technology, ISR, PCT/CN2020/120387, Dec. 30, 2020, 2 pgs.
Tencent Technology, WO, PCT/CN2020/120387, Dec. 30, 2020, 3 pgs.
Tencent Technology, IPRP, PCT/CN2020/120387, May 17, 2022, 4 pgs.

* cited by examiner

SAMPLING RATE PROCESSING METHOD, APPARATUS, AND SYSTEM, STORAGE MEDIUM, AND COMPUTER DEVICE

CROSS-REFERENCE TO RELATED APPLICATIONS

This application is a continuation application of PCT Patent Application No. PCT/CN2020/120387, entitled "SAMPLING RATE PROCESSING METHOD, APPARATUS AND SYSTEM, AND STORAGE MEDIUM AND COMPUTER DEVICE" filed on Oct. 12, 2020, which claims priority to Chinese Patent Application No. 201911317463.X, filed with the State Intellectual Property Office of the People's Republic of China on Dec. 19, 2019, and entitled "SAMPLING RATE PROCESSING METHOD, APPARATUS, AND SYSTEM, STORAGE MEDIUM, AND COMPUTER DEVICE", all of which are incorporated herein by reference in their entirety.

FIELD OF THE TECHNOLOGY

This application relates to the field of computer technologies, and in particular, to a sampling rate processing method, apparatus, and system, a storage medium, and a computer device.

BACKGROUND OF THE DISCLOSURE

With the development of computer technologies and network technologies, it is increasingly common for users to transmit voice signals over the Internet. For example, voice signals are transmitted in live streaming or broadcast. Generally, a transmitter sets a high sampling rate in a case of a high sound quality service requirement, which makes better voice quality of an information source.

However, although the transmitter makes better voice quality of the information source by using the relatively high sampling rate, it is possible for a receiver to encounter sound distortion during playing of voice, causing a poor voice communication effect.

SUMMARY

According to embodiments provided in this application, a sampling rate processing method, apparatus, and system, a storage medium, and a computer device are provided.

A sampling rate processing method is performed by a computer device, the method including:

obtaining a first audio signal recorded by a transmitting device, the first audio signal being recorded according to an initial sampling rate of the transmitting device;

obtaining a second audio signal recorded by a receiving device during playing of the first audio signal, the second audio signal being recorded according to the initial sampling rate;

determining a frequency response gain value of the receiving device according to a power spectrum of the first audio signal and a power spectrum of the second audio signal;

determining a target sampling rate of the transmitting device according to the initial sampling rate and the frequency response gain value; and configuring the transmitting device to record audio signals according to the target sampling rate.

A non-transitory computer-readable storage medium storing computer-readable instructions is provided, the computer-readable instructions, when executed by one or more processors, causing the one or more processors to perform the operations of the sampling rate processing method.

A computer device is provided, including a memory and a processor, the memory storing computer-readable instructions, the computer-readable instructions, when executed by the processor, causing the processor to perform the operations of the sampling rate processing method.

Details of one or more embodiments of this application are provided in the accompany drawings and descriptions below. Other features, objectives, and advantages of this application are illustrated in the specification, the accompanying drawings, and the claims.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may still derive other accompanying drawings from these accompanying drawings without creative efforts.

DESCRIPTION OF EMBODIMENTS

To make the objectives, technical solutions, and advantages of this application clearer and more understandable, this application is further described in detail below with reference to the accompanying drawings and the embodiments. It is to be understood that the specific embodiments described herein are merely used to explain this application but are not intended to limit this application.

Figure 1:
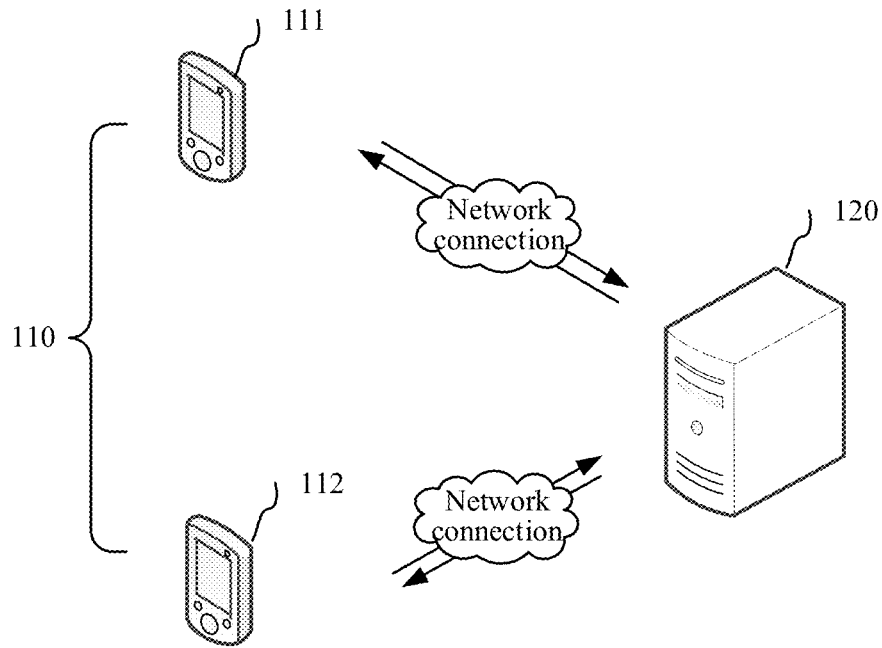
FIG. 1 is a diagram of an application environment of a sampling rate processing method according to an embodiment.

FIG. 1 is a diagram of an application environment of a sampling rate processing method according to an embodiment. Referring to FIG. 1, the application environment of the sampling rate processing method includes a terminal 110 and a server 120. The terminal 110 and the server 120 are connected through a network. The terminal 110 includes at least a transmitting device 111 and a receiving device 112. The transmitting device 111 and the receiving device 112 may directly communicate, or communicate through the server 120. The terminal 110 may be specifically a mobile terminal. The mobile terminal may be specifically at least one of a mobile phone, a tablet computer, a notebook computer, and the like. The server 120 may be implemented by using an independent server or a server cluster including a plurality of servers.

It may be understood that both the terminal 110 and the server 120 may be configured to separately perform the foregoing sampling rate processing method. When the sampling rate processing method provided in the embodiments of this application is performed by a terminal, the terminal may be a transmitting device of an audio signal, or a receiving device of an audio signal. If the terminal is the transmitting device of the audio signal, the terminal needs to obtain, from a corresponding receiving device, a second audio signal recorded by the receiving device, to perform the sampling rate processing method provided in the embodiments of this application. If the terminal is the receiving device of the audio signal, the terminal needs to obtain, from a corresponding transmitting device, a first audio signal recorded by the transmitting device, to perform the sampling rate processing method provided in the embodiments of this application. When the sampling rate processing method provided in the embodiments of this application is performed by a server, the server needs to obtain, from a transmitting device of an audio signal, a first audio signal recorded by the transmitting device, and obtain, from a receiving device of the audio signal, a second audio signal recorded by the receiving device, to perform the sampling rate processing method provided in the embodiments of this application.

The foregoing application environment shown in FIG. 1 is merely an example. In actual application, in addition to an application scenario of a two-person call, the sampling rate processing method provided in the embodiments of this application may be alternatively applied to an application scenario of a call among more than two persons, or even other application scenarios in which an audio signal needs to be transmitted. In the application scenario of a call among more than two persons, there may be more than one transmitting device and more than one receiving device. No limitation is imposed herein on application scenarios to which the sampling rate processing method provided in the embodiments of this application is applicable. In addition, in some embodiments, the transmitting device may be alternatively a receiving device, and the receiving device may be alternatively a transmitting device. For example, when a terminal A makes a voice call with a terminal B, when the terminal A transmits an audio signal to the terminal B, the terminal A is the transmitting device, and the terminal B is the receiving device; and when the terminal B transmits an audio signal to the terminal A, the terminal B is the transmitting device, and the terminal A is the receiving device.

In some embodiments, the terminal 110 may alternatively perform the foregoing sampling rate processing method through an application loaded and running on the terminal 110. The application may be specifically a voice call application, a live streaming application, a broadcast application, or the like. In this case, it may be understood that, when the terminal 110 performs the foregoing sampling rate processing method through the application loaded and running on the terminal 110, an audio signal may be alternatively recorded by the application invoking a microphone of the terminal, and the audio signal may be alternatively played by the application invoking a loudspeaker of the terminal.

Figure 2:
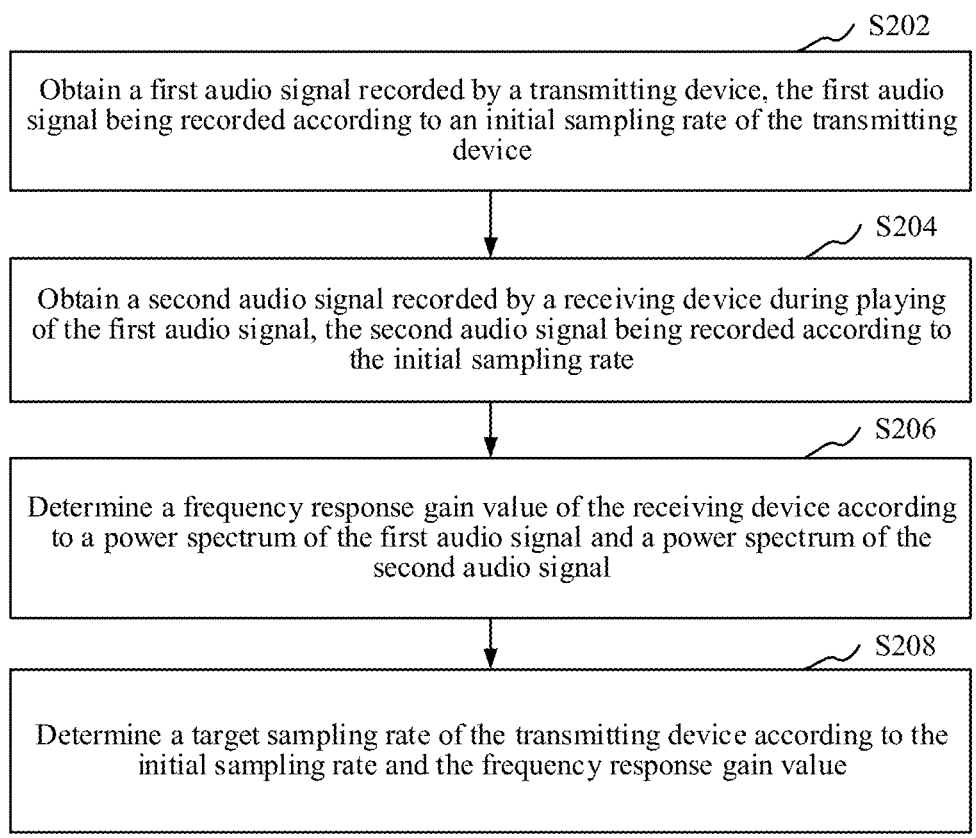
FIG. 2 is a schematic flowchart of a sampling rate processing method according to an embodiment.

As shown in FIG. 2, in an embodiment, a sampling rate processing method is provided. In this embodiment, an example in which the method is applied to the receiving device 112 in FIG. 1 is mainly used for description. Referring to FIG. 2, the sampling rate processing method specifically includes the following steps:

S202: Obtain a first audio signal recorded by a transmitting device, the first audio signal being recorded according to an initial sampling rate of the transmitting device.

The initial sampling rate is a sampling rate that is initially set. The initial sampling rate is set by the transmitting device according to a voice quality requirement of a target service. The target service refers to a service of voice data interaction between the transmitting device and a receiving device. Different services have different voice quality requirements. For example, the target service includes a call service, a live streaming service, or a broadcast service.

When the transmitting device records an audio signal, a higher sampling rate used indicates better quality of the recorded audio signal. Therefore, the transmitting device may set a specific value of the initial sampling rate, such as 11 kHz, 22 kHz, or 48 kHz, according to voice quality requirements of different services.

The first audio signal may be an audio signal that is acquired by the transmitting device in real time and transmitted to the receiving device in real time during a real-time voice interaction between the transmitting device and the receiving device, for example, a voice call signal transmitted by the transmitting device to the receiving device in real time during a real-time voice call between the transmitting device and the receiving device. The first audio signal may be alternatively a test signal recorded by the transmitting device in advance or in real time, for example, an audio signal used for testing that is recorded in advance or currently before the transmitting device interacts with the receiving device based on the target service.

In an embodiment, the obtaining a first audio signal recorded by a transmitting device includes: obtaining the first audio signal recorded and encoded by the transmitting device.

Figure 3:
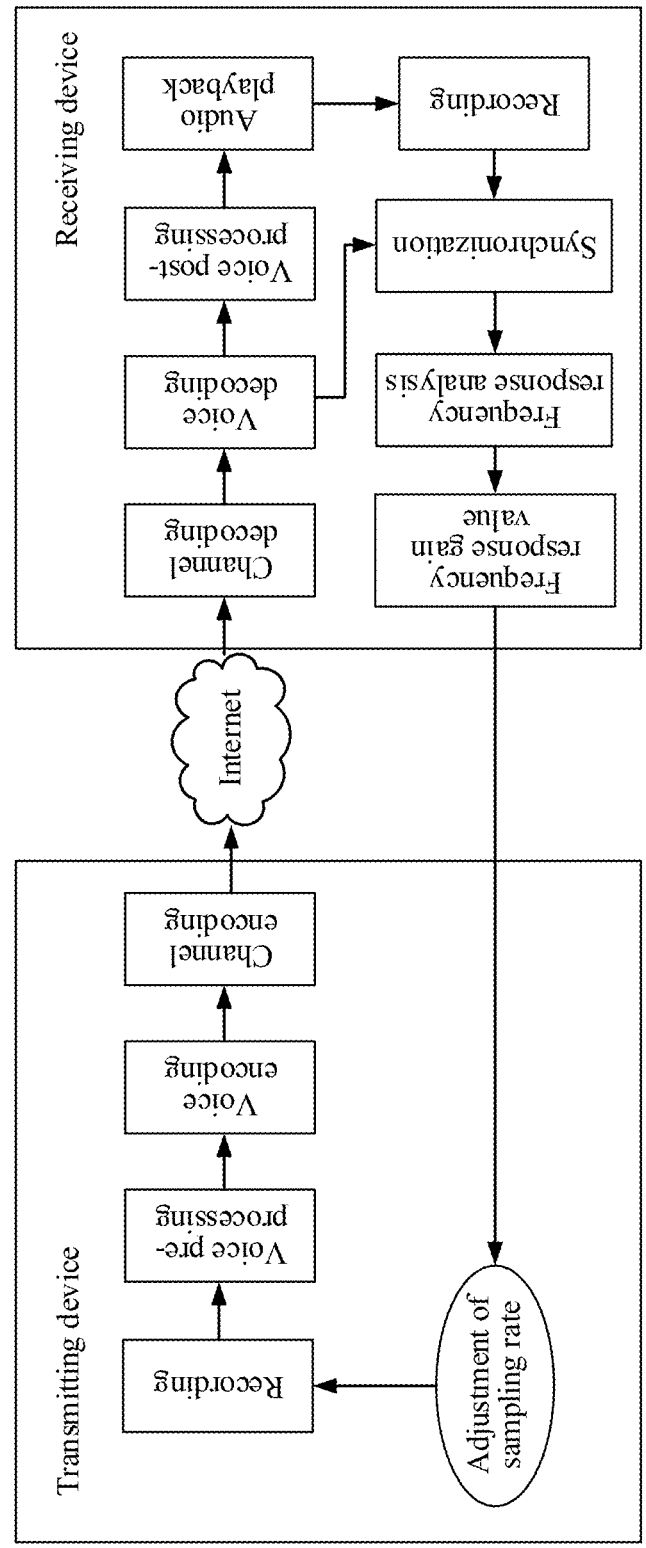
FIG. 3 is a schematic flowchart of a sampling rate processing principle according to an embodiment.

Specifically, as shown in FIG. 3, the transmitting device may set an initial sampling rate according to a service requirement, and obtain a first audio signal through recording according to the initial sampling rate; and after voice pre-processing, voice encoding and channel encoding are performed on the first audio signal, transmit the first audio signal to the receiving device, or transmit the first audio signal to a server, and the server forwards the first audio signal to the receiving device. The audio signal between the devices is transmitted based on the Internet.

In a specific embodiment, a real-time voice call connection is established between the transmitting device and the receiving device, and the transmitting device sets an initial sampling rate according to a requirement of the current voice call connection, to make a call, that is, records a real-time voice signal (that is, a first audio signal) by using the initial sampling rate. For example, the transmitting device acquires voice of a user of the transmitting device according to the initial sampling rate by using a microphone, to obtain the real-time voice signal.

S204: Obtain a second audio signal recorded by a receiving device during playing of the first audio signal, the second audio signal being recorded according to the initial sampling rate.

Specifically, after receiving the first audio signal, the receiving device plays the first audio signal through a loudspeaker, and obtains the second audio signal through recording during playing of the first audio signal. The second audio signal is an audio signal obtained by recording the first audio signal, and a recorded sampling rate is the initial sampling rate. In other words, sampling rates used during recording of the first audio signal and the second audio signal are the same.

The receiving device may start recording when starting playing the first audio signal. In this way, if noise signals exist in the recorded second audio signal, the noise signals may be removed in a subsequent processing step. The noise signals are other signals than the first audio signal, such as ambient sound signals or call response signals. The receiving device may alternatively detect noise signals during playing of the first audio signal, and then start recording when the detected noise signals meet a recording condition. In this way, noise signals in the second audio signal can be minimized, thereby avoiding increasing processing operations in a subsequent process.

In an embodiment, the obtaining a second audio signal recorded by a receiving device during playing of the first audio signal includes: obtaining the second audio signal recorded by the receiving device during decoding and playing of the first audio signal.

Specifically, as shown in FIG. 3, after receiving the first audio signal, the receiving device may perform channel decoding, voice decoding, and voice post-processing on the first audio signal and then play the first audio signal. Further, during playing of the first audio signal, a computer device records the first audio signal to obtain the second audio signal.

S206: Determine a frequency response gain value of the receiving device according to a power spectrum of the first audio signal and a power spectrum of the second audio signal.

The power spectrum is short for a power spectrum density function, and is defined as signal power in unit frequency band. The power spectrum represents changes of the signal power with a frequency, that is, distribution of the signal power in a frequency domain. The power spectrum represents a change relationship between the signal power and the frequency.

A frequency response (FR for short) is a relationship between, when an audio output component of a terminal device outputs an audio signal, a sound pressure and a phase of the audio output device and a frequency of the audio signal. The frequency response reflects a response capability of the audio output component to audio signals of different frequencies. The frequency response gain value is a gain factor of signal power of a playback signal and a recording signal of the audio output component of the terminal device at the same frequency point.

Specifically, the receiving device may perform Fourier transform on the first audio signal and the second audio signal respectively, to obtain respective corresponding power spectra, and perform frequency response analysis according to the power spectra of the two signals, to obtain the frequency response gain value of the receiving device. It may be understood that the frequency response analysis is performed frame by frame by the receiving device according to the power spectra. Therefore, the receiving device may start performing frequency response analysis during recording of the second audio signal, or perform frequency response analysis after recording of the second audio signal ends.

In an embodiment, the determining a frequency response gain value of the receiving device according to a power spectrum of the first audio signal and a power spectrum of the second audio signal includes: determining the frequency response gain value of the receiving device according to the power spectrum of the decoded first audio signal and the power spectrum of the second audio signal.

Specifically, referring to FIG. 3, the receiving device may specifically perform frequency response analysis between an audio signal on which voice decoding has been performed and a signal obtained by recording and playing the audio signal, to obtain the frequency response gain value of the receiving device. In other embodiments, signal synchronization may be performed before the frequency response analysis.

S208: Determine a target sampling rate of the transmitting device according to the initial sampling rate and the frequency response gain value.

The target sampling rate is a sampling rate that is used for acquiring an audio signal when a voice interaction of acoustic capability matching is performed between the transmitting device and the receiving device and that is intended to be obtained in the embodiments of this application. The transmitting device acquires the audio signal according to the target sampling rate and transmits the audio signal to the receiving device for playback. On one hand, calculation processing resources and storage resources of the transmitting device can be effectively used; on the other hand, a better playback effect can be obtained when the audio signal is played at the receiving device. In addition, network transmission resources can be effectively used. In some embodiments, the transmitting device is configured to record audio signals according to the target sampling rate.

In an embodiment, S208 may include: determining a playback frequency band upper limit value of the receiving device according to the initial sampling rate and the frequency response gain value; and generating the target sampling rate of the transmitting device according to the playback frequency band upper limit value.

The playback frequency band upper limit value of the receiving device represents an upper limit value of a frequency band that the receiving device can play effectively and actually, such as 12 kHz or 24 kHz.

Generally, the target sampling rate may be twice the playback frequency band upper limit value, or slightly greater than twice the playback frequency band upper limit value. For example, if the playback frequency band upper limit value is 12 kHz, the target sampling rate may be 2*12 kHz, or slightly greater than 2*12 kHz.

It may be understood that the process of determining the playback frequency band upper limit value of the receiving device and the process of generating the target sampling rate of the transmitting device may be both performed on the transmitting device or the receiving device. Certainly, the receiving device may alternatively determine a playback frequency band upper limit value of the receiving device, and then transmit the playback frequency band upper limit value to the transmitting device, and the transmitting device generates the target sampling rate of the transmitting device.

Still referring to FIG. 3, the receiving device may feedback the obtained frequency response gain value to the transmitting device, and the transmitting device adjusts the sampling rate according to the frequency response gain value.

In an embodiment, the determining a target sampling rate of the transmitting device according to the initial sampling rate and the frequency response gain value includes: determining an upper boundary value and a lower boundary value of a test frequency range based on the initial sampling rate; determining, in the test frequency range, a target frequency used as the playback frequency band upper limit value of the receiving device, an average power spectrum in a range from the lower boundary value to the target frequency being less than an average power spectrum in a range from the target frequency to the upper boundary value, and the frequency response gain value being used for calculating the average power spectrum; and generating the target sampling rate of the transmitting device according to the playback frequency band upper limit value.

The test frequency range refers to a frequency range in which the playback frequency band upper limit value of the receiving device is found. In other words, the playback frequency band upper limit value of the receiving device is determined in the frequency range. Generally, the test frequency range is calculated based on the initial sampling rate. For example, 1/20 of the initial sampling rate is used as the lower boundary value of the test frequency range, and 1/2 of the initial sampling rate is used as the upper boundary value of the test frequency range.

It may be understood that the target frequency divides the test frequency range into two intervals, where an interval having a lower frequency value may be referred to as a low-frequency interval, and an interval having a higher frequency value may be referred to as a high-frequency interval. In this way, the receiving device may respectively calculate a power spectrum average value of the low-frequency interval and a power spectrum average value of the high-frequency interval based on the frequency response gain value obtained through calculation in the foregoing steps, to find a target frequency to make the power spectrum average value of the high-frequency interval far greater than the power spectrum average value of the low-frequency interval. In this case, the target frequency may represent an upper limit value of a frequency band that a playback device can play effectively and actually.

In a specific embodiment, the receiving device may determine the local playback frequency band upper limit value by using the following codes:

```
{Pos=m4−1
avgh=avgl=0;
for k=m4: m3
   for i=m4: pos
      avgh=avgh+Fr(T, i)
   end
   avgh=avgh/(m4−pos+1); % calculate a power spectrum
      average value of a high-frequency part pos−m4
   for i=pos: m3
      avgl=avgl+Fr(T, i)
   end
   avgl=avgl/(pos−m3+1); % calculate a power spectrum
      average value of a low-frequency part m3−pos
   if avgh>C*avgl
      Truepos=pos;
      break; % determine whether the high-frequency
         power spectrum average value is large enough
         (relative to the low-frequency power spectrum
         average value); if yes, record pos as a high-
         frequency separation point and the playback fre-
         quency band upper limit value of the receiving
         device
   end
   pos=pos−1;
end}
``` m3 is a frequency point number of the lower boundary value of the test frequency range, and m4 is a frequency point number of the upper boundary value of the test frequency range. For example, if the initial sampling rate of the transmitting device is fs, m3 is a frequency point number corresponding to a frequency 0.1*(fs/2), and m4 is a frequency point number corresponding to a frequency (fs/2). T is a calculation cycle of calculating the playback frequency band upper limit value, that is, the receiving device performs the foregoing code after the first audio signal is played T frames. The receiving device may perform the code only once, or perform the code once every T frames. C is constant, and may generally be set to a smaller constant. When a high-frequency playback capability of the receiving device is poorer, an average frequency response gain avgl of the low-frequency interval may be far greater than an average frequency response gain avgh of the high-frequency interval. Truepos is a final frequency point number of the playback frequency band upper limit value of the receiving device.

In this embodiment, the upper limit value of the frequency band that the receiving device can play effectively and actually may be determined based on the initial sampling rate of the transmitting device and a result of the frequency response analysis, so that the target sampling rate of the transmitting device may be generated based on the frequency band upper limit value. When the target sampling rate is used for language sampling of a voice call between the transmitting device and the receiving device, not only calculation processing resources, storage resources, and network transmission resources of the transmitting device can be effectively used, but also the playback effect of the receiving device can be improved, thereby avoiding distortion.

In an embodiment, communication may be two-way communication between two parties (A and B), and one of the two communication parties (A or B) may be used as a transmitter or a receiver. Therefore, when the communication party A transmits an audio signal to the communication party B for communication, the communication party B may be used as the receiver to perform the sampling rate processing method provided in the embodiments of this application, and feedback an obtained playback frequency band upper limit value of the communication party B to the communication party A. The communication party A may subsequently generate a target sampling rate according to the playback frequency band upper limit value of the communication party B, and sample, according to the target sampling rate, a voice communication signal to be transmitted to the communication party B. When the communication party B transmits a response audio signal to the communication party A for communication, the communication party A may be used as the receiver to perform the sampling rate processing method provided in the embodiments of this application, and feedback an obtained playback frequency band upper limit value of the communication party A to the communication party B. The communication party B may subsequently generate a target sampling rate according to the playback frequency band upper limit value of the communication party A, and sample, according to the target sampling rate, a voice communication signal to be transmitted to the communication party A.

In an embodiment, there may be one receiving device. In this scenario, the transmitting device may adjust a sampling rate of audio recording based on an actual playback capability of the only one receiving device. That is, the transmitting device obtains a playback frequency band upper limit value transmitted by the receiving device, generates a target sampling rate matching the actual playback capability of the receiving device according to the playback frequency band upper limit value, and then acquires an audio signal according to the target sampling rate and transmits the audio signal to the receiving device for playback.

In an embodiment, there may be more than one receiving device. In this scenario, the transmitting device may adjust a sampling rate of audio recording based on an average actual playback capability (an average playback frequency band upper limit value) of the more than one receiving device; or adjust a sampling rate of audio recording based on an actual playback capability of a receiving device that has a strongest actual playback capability (a maximum playback frequency band upper limit value) in the more than one receiving device; or adjust a sampling rate of audio recording based on an actual playback capability of the largest quantity of receiving devices that have the same actual playback capability in the more than one receiving device, or the like.

In the sampling rate processing method, from the perspective of acoustic capability matching from the transmitting device to the receiving device, frequency spectrum analysis is performed based on the first audio signal recorded by the transmitting device and the second audio signal obtained by the receiving device recording the first audio signal, and the target sampling rate matching with the playback capability of the receiving device is determined. The first audio signal and the second audio signal are recorded according to the initial sampling rate, and the target sampling rate matching the actual playback capability of the receiving device is determined based on the initial sampling rate and the frequency response gain value of the receiving device. In this way, when the target sampling rate is used for language sampling of a voice call between the transmitting device and the receiving device, not only calculation processing resources, storage resources, and network transmission resources of the transmitting device can be effectively used, but also the playback effect of the receiving device can be improved, thereby avoiding distortion.

In an embodiment, the obtaining a first audio signal recorded by a transmitting device includes: obtaining the first audio signal transmitted through a communication connection. The determining a target sampling rate of the transmitting device according to the initial sampling rate and the frequency response gain value includes: determining a playback frequency band upper limit value of the receiving device according to the initial sampling rate and the frequency response gain value; and generating the target sampling rate of the transmitting device according to the playback frequency band upper limit value. The sampling rate processing method further includes: continuing recording a third audio signal and continuing transmitting the third audio signal through the communication connection after a sampling rate of recording an audio signal is adjusted from the initial sampling rate to the target sampling rate.

The communication connection is a connection for audio signal communication between the transmitting device and the receiving device. The communication connection may be a voice call connection, a live streaming data communication connection, a broadcast data communication connection, or the like. Live streaming data includes live streaming voice data. The communication connection may be a one-way communication connection such as the live streaming data communication connection, or a two-way communication connection such as the voice call connection.

Specifically, after the transmitting device establishes a communication connection to the receiving device, the transmitting device may record the first audio signal in real time by using the initial sampling rate, and transmit the first audio signal to the receiving device in real time based on the communication connection, for example, a real-time voice data transmission process of a voice call between two parties. In this way, the receiving device receives the first audio signal through the communication connection.

Further, the receiving device may obtain the playback frequency band upper limit value of the receiving device according to the initial sampling rate and the frequency response gain value. After obtaining the playback frequency band upper limit value, the receiving device may feedback the playback frequency band upper limit value to the transmitting device, and the transmitting device generates the target sampling rate according to the playback frequency band upper limit value, and continues recording the third audio signal and continues transmitting the third audio signal through the communication connection after the sampling rate of recording the audio signal is adjusted from the initial sampling rate to the target sampling rate.

In other embodiments, after obtaining the local playback frequency band upper limit value, the receiving device may generate the target sampling rate based on the playback frequency band upper limit value, and feedback the target sampling rate to the transmitting device. Then, after generating the target sampling rate based on the playback frequency band upper limit value, the transmitting device continues recording the third audio signal and continues transmitting the third audio signal through the communication connection after the sampling rate of recording the audio signal is adjusted from the initial sampling rate to the target sampling rate.

The first (third) audio signal may include a voice communication signal to be transmitted by the transmitting device to the receiving device. The first (third) audio signal may be a digital signal or an analog signal.

In a real-time voice call scenario, the first (third) audio signal may be specifically a voice signal obtained by the transmitting device acquiring voice of a speaker through a microphone.

In a specific embodiment, the transmitting device establishes a real-time voice call connection to the receiving device, and the transmitting device may obtain a first audio signal by recording voice of a speaker in real time through a microphone, and transmit the first audio signal to the receiving device in real time based on the real-time voice call connection. The receiving device obtains a local playback frequency band upper limit value based on the sampling rate processing method provided in the foregoing embodiments, and feeds back the playback frequency band upper limit value to the transmitting device. The transmitting device generates a target sampling rate according to the playback frequency band upper limit value, and continues recording the voice of the speaker based on the target sampling rate, to continue the voice call.

In the foregoing embodiments, an actual sampling rate of a transmitter is adjusted in real time in a real-time communication process, so that acoustic capability matching between two communication parties can be effectively implemented, communication quality can be improved, and no other time resources are occupied.

In other embodiments, the transmitting device may establish a communication test connection to the receiving device, and the transmitting device may record a first audio signal in real time or obtain a first audio signal recorded in advance, and transmit the first audio signal to the receiving device based on the communication test connection. The receiving device obtains a local playback frequency band upper limit value based on the sampling rate processing method provided in the foregoing embodiments, and feeds back the playback frequency band upper limit value to the transmitting device. The transmitting device generates a target sampling rate according to the playback frequency band upper limit value. In this way, when the transmitting device formally communicates with the receiving device subsequently, the transmitting device may record a communication signal by using the target sampling rate, and communicate with the receiving device. In this embodiment, the target sampling rate is obtained in advance by matching an acoustic capability between two communication parties, and therefore can be directly used in actual communication, thereby improving call efficiency and call quality.

In an embodiment, the sampling rate processing method further includes: determining a delay value between the first audio signal and the second audio signal; and performing, after the first audio signal and the second audio signal are synchronized according to the delay value, the step of determining a frequency response gain value of the receiving device according to a power spectrum of the first audio signal and a power spectrum of the second audio signal.

It may be understood that, generally, performing frequency response analysis on a playback device is to perform comparison analysis on a playback signal of the playback device and a recording signal of the playback device in a frequency domain, and divide a power spectrum of the playback signal and a power spectrum of the recording signal at the same frequency point to obtain gain factors of frequency points. These gain factors are a frequency response value (that is, the frequency response gain value) of the playback device. The frequency response analysis is to obtain acoustic output capabilities of the playback device at different frequency points by analyzing frequency response gains of the playback device.

In some embodiments, a recording signal (that is, the second audio signal) of the receiving device is acquired by a microphone of the receiving device after a voice decoding signal (that is, the first audio signal) is internally processed by the receiving device and then sound thereof is transmitted in the air through a loudspeaker. In this way, there is a specific time difference (that is, a delay) between the recording signal of the receiving device and the voice decoding signal of the receiving device. Therefore, the two signals are not synchronous, and spectrum comparison cannot be directly performed. Therefore, signal synchronization needs to be first performed, and then frequency response analysis is performed on the synchronized signals. The synchronization needs to obtain a delay value between the voice decoding signal and the recording signal, and the delay value is actually an echo delay value of the receiving device.

In an embodiment, the determining a delay value between the first audio signal and the second audio signal includes: obtaining a first power spectrum and a second power spectrum, the first power spectrum including a power spectrum of a current frame of first audio signal and a power spectrum of more than one frame of first audio signal before the current frame of first audio signal, and the second power spectrum including a power spectrum of a current frame of second audio signal; performing an XOR accumulation operation according to the first power spectrum and the second power spectrum, to obtain candidate delay values; and selecting an echo delay value between the first audio signal and the second audio signal from the candidate delay values.

Specifically, the receiving device may perform Fourier transform (such as fast Fourier transform (FFT)) on frames of first audio signal and frames of second audio signal, and then obtain power spectra of the frames of audio signal based on Fourier transform results. Then, an XOR accumulation operation is performed on the power spectrum of the current frame of first audio signal, the power spectrum of more than one frame of first audio signal before the current frame of first audio signal, and the power spectrum of the current frame of second audio signal.

In an embodiment, the performing an XOR accumulation operation according to the first power spectrum and the second power spectrum, to obtain candidate delay values includes: obtaining a first binarization array corresponding to the first audio signal according to the first power spectrum and smoothing values of frequency points in the first power spectrum; obtaining a second binarization array corresponding to the second audio signal according to the second power spectrum and smoothing values of frequency points in the second power spectrum; and performing the XOR accumulation operation according to the first binarization array and the second binarization array, to obtain the candidate delay values.

Figure 4:
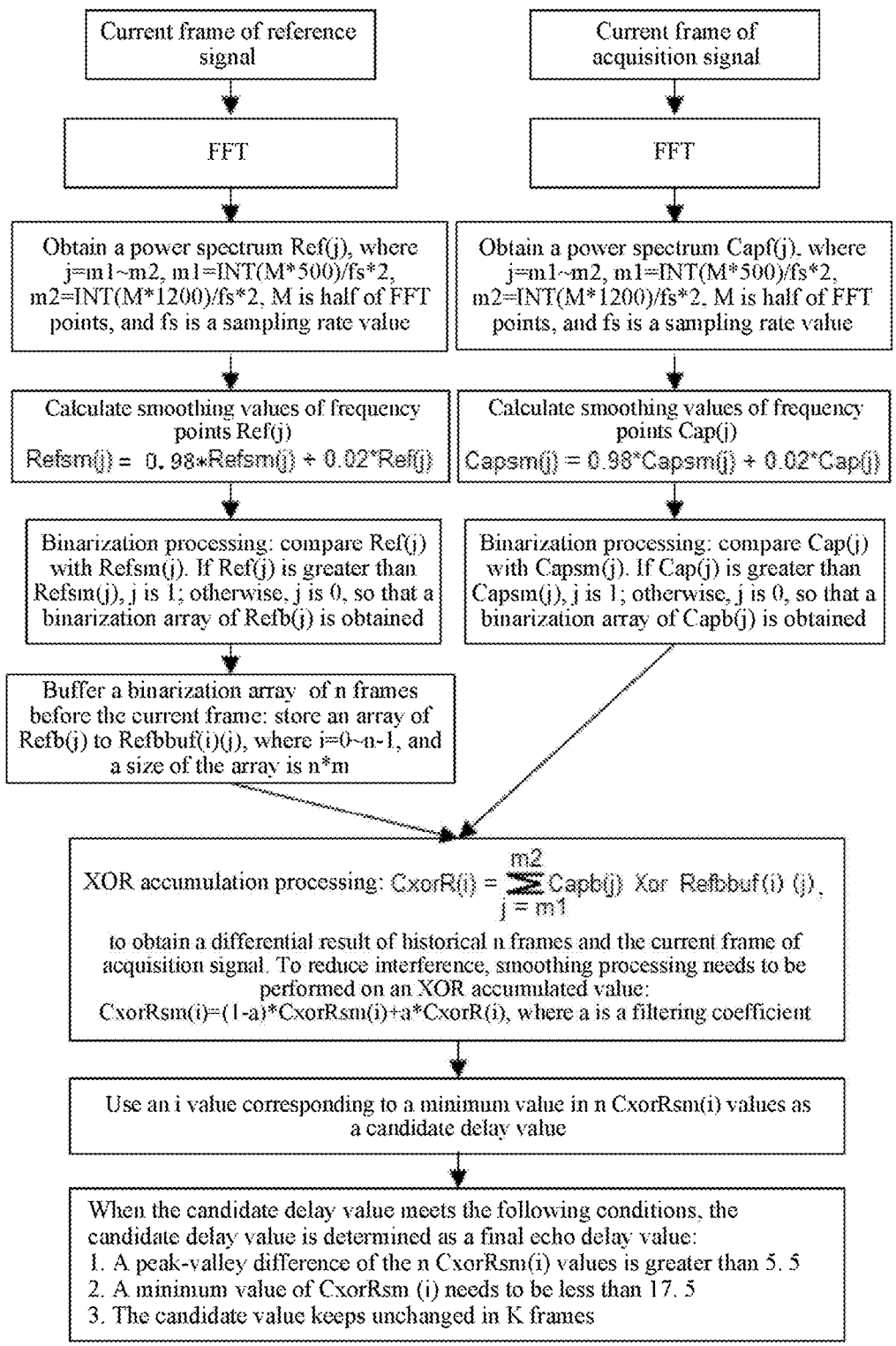
FIG. 4 is a schematic flowchart of estimating a delay value between a first audio signal and a second audio signal according to an embodiment.

Specifically, referring to FIG. 4, the first audio signal is a reference signal, and the second audio signal is an acquisition signal. The receiving device may perform FFT of 2M frequency points on the current frame of first audio signal. Then, assuming that j is a frequency point number, power spectra Ref(j) corresponding to frequency points j of the current frame of first audio signal are calculated according to FFT results corresponding to frequency points of the current frame of first audio signal, where j∈[m1, m2], m1=INT(M*500)/fs*2, m2=INT(M*1200)/fs*2, M is half of FFT points, and fs is the initial sampling rate. Herein, m1 and m2 respectively correspond to an effective frequency range of echo delay analysis, and frequency point number values corresponding to 500 Hz and 1.2 kHz are generally selected.

To reduce unstable interference factors of an audio signal, the receiving device may further calculate smoothing values of power spectra Ref(j) of frequency points of the current frame of first audio signal, and smoothing values of power spectra Cap(j) of frequency points of the current frame of second audio signal. Assuming that a smoothing value corresponding to a power spectrum of the frequency point j of the current frame of first audio signal is Refsm(j), Refsm(j)=0.98*Refsm(j)+0.02*Ref(j). Assuming that a smoothing value corresponding to a power spectrum of the j frequency point of the current frame of second audio signal is Capsm(j), Capsm(j)=0.98*Capsm(j)+0.02*Cap(j).

Further, the receiving device may perform binarization processing based on Ref(j) and Refsm(j), and perform binarization processing based on Cap(j) and Capsm(j). For the current frame of first audio signal, the receiving device may compare Ref(j) with Refsm(j). If Ref(j) is greater than Refsm(j), the frequency point j is set to a first value (such as 1); otherwise, the frequency point j is set to a second value (such as 0), so that binarization values corresponding to frequency points of the current frame of first audio signal are obtained, and constitute an binarization array Refb(j) corresponding to the current frame of first audio signal. The receiving device may perform the same processing on the current frame of second audio signal, to obtain an binarization array Capb(j) corresponding to the current frame of second audio signal.

Further, the receiving device may obtain a binarization array of n frames of first audio signal before the current frame of first audio signal, to obtain an array from Refb(j) to Refbbuf(i)(j), where i∈[0, n−1], and a size of the array is n*m. Refbbuf(i)(j) represents a binarization value of a $j^{th}$ frequency point of an $i^{th}$ frame of first audio signal. In this way, the computer device may perform the XOR accumulation operation:

$$CxorR(i) = \sum\nolimits_{j=m1}^{m2} Capb(j) XorRefbbuf(i)(j) \qquad (1)$$

CxorR(i) represents an XOR accumulation operation result corresponding to the $i^{th}$ frame, and Xor represents the XOR accumulation operation.

Further, to reduce interference, the receiving device may further perform smoothing on the XOR accumulation operation result: CxorRsm(i)=(1−a)*CxorRsm(i)+a*CxorR(i), where i is a frame number, CxorRsm(i) is a smoothing XOR accumulation operation result corresponding to the $i^{th}$ frame, and a is a filtering coefficient.

Further, the receiving device may select the candidate delay values in the smoothing XOR accumulation operation result. Specifically, the receiving device may select a minimum smoothing XOR accumulation operation result from smoothing XOR accumulation operation results corresponding to the n frames, determine delay values corresponding to frame numbers corresponding to the minimum smoothing XOR accumulation operation result as the candidate delay values, and select a final echo delay value in the candidate delay values. For example, an i value corresponding to a minimum value in n CxorRsm(i) values is used as a candidate delay value.

Further, when the candidate delay value meets the following three conditions, the candidate delay value may be selected as the final echo delay value.

(1) A difference between a maximum value and the minimum value of the smoothing XOR accumulation processing results corresponding to the n frames is greater than a first preset value, and the first preset value is, such as, 5.5. For example, a peak-valley difference of the n CxorRsm(i) values is greater than 5.5.

(2) The minimum value of the smoothing XOR accumulation processing results corresponding to the n frames is less than a second preset value, and the second preset value is, such as, 17.5. For example, a minimum value of CxorRsm(i) is less than 17.5.

(3) The candidate delay value keeps unchanged in K frames, the K frames include more than one consecutive n frames, and one candidate delay value is calculated correspondingly for one n frames.

In this embodiment, smoothing processing is performed on the power spectrum to obtain binarization data for subsequent calculation, which can reduce the interference, and improve calculation accuracy.

After obtaining a delay value D between the first audio signal and the second audio signal, the receiving device may offset the first audio signal by D frames in a time domain, so that the first audio signal is basically synchronized with the second audio signal.

In the foregoing embodiments, the frequency response analysis is performed after the first audio signal and the second audio signal are synchronized, which improves accuracy of the frequency response analysis, thereby helping improve validity of subsequent data processing.

In an embodiment, the determining a frequency response gain value of the receiving device according to a power spectrum of the first audio signal and a power spectrum of the second audio signal includes: determining a frequency response gain value of the receiving device on each synchronized audio frame sequentially from the first synchronized audio frame of the first audio signal and the second audio signal according to the power spectrum of the first audio signal and the power spectrum of the second audio signal; and when a quantity of synchronized audio frames reaches a preset quantity of frames, the determining a playback frequency band upper limit value of the receiving device according to the initial sampling rate and the frequency response gain value includes: determining the playback frequency band upper limit value of the receiving device according to the initial sampling rate and a frequency response gain value of the receiving device on a current synchronized audio frame.

Specifically, the receiving device may perform Fourier transform on the synchronized first audio signal and second audio signal, to obtain power spectra of frames of audio signal in the first audio signal and power spectra of frames of audio signal in the second audio signal; and then the power spectra are calculated, to obtain power spectrum values $S_{ref}(j, k)$ of frequency points of the frames of audio signal in the first audio signal and power spectrum values $S_{cap}(j, k)$ of frequency points of the frames of audio signal in the second audio signal, where j is a frame number, and k is a frequency point number.

In an embodiment, the determining a frequency response gain value of the receiving device on each synchronized audio frame sequentially from the first synchronized audio frame of the first audio signal and the second audio signal according to the power spectrum of the first audio signal and the power spectrum of the second audio signal includes: using each synchronized audio frame sequentially from the first synchronized audio frame of the first audio signal and the second audio signal as the current synchronized audio frame; using a frequency response gain value of a previous synchronized audio frame of the current synchronized audio frame as the frequency response gain value of the current synchronized audio frame when a power spectrum value of the current synchronized audio frame of the first audio signal does not exceed a preset power spectrum value; and calculating the frequency response gain value of the current synchronized audio frame according to a frequency response gain value of a previous synchronized audio frame of the current synchronized audio frame and a ratio of the power spectrum value of the first audio signal to a power spectrum value of the second audio signal on the current synchronized audio frame when the power spectrum value of the current synchronized audio frame of the first audio signal exceeds the preset power spectrum value.

Specifically, after obtaining the power spectrum values $S_{ref}(j, k)$ of the frequency points of the frames of audio signal in the first audio signal and the power spectrum values $S_{cap}(j, k)$ of the frequency points of the frames of audio signal in the second audio signal, the receiving device may obtain each frame of first audio signal and a frequency response gain value of a frame of second audio signal that is synchronized with the frame of first audio signal.

The receiving device may use each synchronized audio frame sequentially from the first synchronized audio frame of the first audio signal and the second audio signal as the current synchronized audio frame, and compare the power spectrum value $S_{cap}(j, k)$ of the current synchronized audio frame of the first audio signal with a preset power spectrum value $S_0$. In a case that the power spectrum value of the current synchronized audio frame of the first audio signal does not exceed the preset power spectrum value ($S_{cap}(j, k) \leq S_0$), the frequency response gain value of the previous synchronized audio frame of the current synchronized audio frame is used as the frequency response gain value of the current synchronized audio frame.

In a case that the power spectrum value of the current synchronized audio frame of the first audio signal exceeds the preset power spectrum value ($S_{cap}(j, k) > S_0$), the frequency response gain value of the previous synchronized audio frame of the current synchronized audio frame is compared with the ratio of the power spectrum value of the first audio signal to the power spectrum value of the second audio signal on the current synchronized audio frame.

In a case that a product of the frequency response gain value of the previous synchronized audio frame of the current synchronized audio frame and a first preset value (such as 5) is less than the ratio of the power spectrum value of the first audio signal to the power spectrum value of the second audio signal on the current synchronized audio frame, an added result of a product of the frequency response gain value of the previous synchronized audio frame of the current synchronized audio frame and a second preset value (such as 0.9) and a product of the ratio of the power spectrum value of the first audio signal to the power spectrum value of the second audio signal on the current synchronized audio frame and a third preset value (such as 0.1) is used as the frequency response gain value of the current synchronized audio frame.

In a case that a product of the frequency response gain value of the previous synchronized audio frame of the current synchronized audio frame and the first preset value (such as 5) is greater than or equal to the ratio of the power spectrum value of the first audio signal to the power spectrum value of the second audio signal on the current synchronized audio frame, an added result of a product of the frequency response gain value of the previous synchronized audio frame of the current synchronized audio frame and a second preset value (such as 0.995) and a product of the ratio of the power spectrum value of the first audio signal to the power spectrum value of the second audio signal on the current synchronized audio frame and a third preset value (such as 0.005) is used as the frequency response gain value of the current synchronized audio frame.

The preset power spectrum value $S_0$ is a constant used for avoiding an inaccurate calculation value due to an excessively small power spectrum value $S_{ref}$ of the first audio signal.

In an embodiment, a frequency response gain value of the receiving device on a $j^{th}$ synchronized audio frame is calculated according to the following formula:

$$Fr(j, k) = \begin{cases} 0.9 * Fr(j-1, k) + 0.1 * \frac{S_{cap}(j, k)}{S_{ref}(j, k)} & f\left(S_{ref}(j, k) > S_0 \&\& 5 * Fr(j-1, k) < \frac{S_{cap}(j, k)}{S_{ref}(j, k)}\right) \\ 0.995 * Fr(j-1, k) + 0.005 * \frac{S_{cap}(j, k)}{S_{ref}(j, k)} & if\left(S_{ref}(j, k) > S_0 \&\& 5 * Fr(j-1, k) \geq \frac{S_{cap}(j, k)}{S_{ref}(j, k)}\right), \\ Fr(j-1, k) & if\ (S_{ref}(j, k) \leq S_0) \end{cases} \quad (2)$$

j is a frame number of an audio frame, k is a frequency point number, $S_{cap}(j, k)$ is a power spectrum value of a $k^{th}$ frequency point of a $j^{th}$ frame in the first audio signal, $S_{ref}(j, k)$ is a power spectrum value of a $k^{th}$ frequency point of a $j^{th}$ frame in the second audio signal, and $S_0$ is a constant.

Further, when the quantity of synchronized audio frames reaches the preset quantity of frames, the receiving device may determine the playback frequency band upper limit value of the receiving device according to the initial sampling rate and the frequency response gain value of the receiving device on the current synchronized audio frame. For example, if the preset quantity of frames is T frames, when a quantity of frames of synchronized audio signals of the first audio signal and the second audio signal reaches the T frames, the receiving device may determine the playback frequency band upper limit value of the receiving device according to the initial sampling rate and the frequency response gain value of the receiving device on the current synchronized audio frame.

In an embodiment, the receiving device may alternatively use the preset quantity of frames as a calculation cycle, and each time the preset quantity of frames are played, the receiving device determines the playback frequency band upper limit value of the receiving device according to the initial sampling rate and the frequency response gain value of the receiving device on the current synchronized audio frame. For example, if the preset quantity of frames is T frames, when the quantity of frames of synchronized audio signals of the first audio signal and the second audio signal reaches the T frames, 2T frames, 3T frames, . . . , and nT frames, the receiving device determines the playback frequency band upper limit value of the receiving device according to the initial sampling rate and the frequency response gain value of the receiving device on the current synchronized audio frame.

In an embodiment, when playing of the first audio signal reaches the preset quantity of frames, the receiving device may further determine the playback frequency band upper limit value of the receiving device according to the initial sampling rate and the frequency response gain value of the receiving device on the current synchronized audio frame. The receiving device may alternatively use the preset quantity of frames as a calculation cycle, and each time the preset quantity of frames of the first audio signal are played, the receiving device determines the playback frequency band upper limit value of the receiving device according to the initial sampling rate and the frequency response gain value of the receiving device on the current synchronized audio frame.

In the foregoing embodiments, the playback capability of the receiving device is estimated after a specific quantity of frames, which can effectively avoid noise interference and improve estimation accuracy.

In an embodiment, a sampling rate processing system is provided, including a transmitting device and a receiving device. The transmitting device is configured to transmit a recorded first audio signal to the receiving device, the first audio signal being recorded according to an initial sampling rate of the transmitting device; the receiving device is configured to play the first audio signal and record a second audio signal during playing of the first audio signal, the second audio signal being recorded according to the initial sampling rate; the receiving device is further configured to determine a frequency response gain value of the receiving device according to a power spectrum of the first audio signal and a power spectrum of the second audio signal; and the receiving device is further configured to determine a target sampling rate of the transmitting device according to the initial sampling rate and the frequency response gain value. In some embodiments, the transmitting device is configured to record audio signals according to the target sampling rate.

In an embodiment, the transmitting device is further configured to establish a communication connection to the receiving device, record the first audio signal according to the initial sampling rate after the communication connection is established, and transmit the first audio signal through the communication connection; the receiving device is further configured to receive the first audio signal through the communication connection; the receiving device is further configured to determine a playback frequency band upper limit value of the receiving device according to the initial sampling rate and the frequency response gain value, and transmit the playback frequency band upper limit value to the transmitting device; and the transmitting device is further configured to generate the target sampling rate based on the playback frequency band upper limit value, and continue recording a third audio signal and continue transmitting the third audio signal through the communication connection after a sampling rate of recording an audio signal is adjusted from the initial sampling rate to the target sampling rate.

In an embodiment, the receiving device is further configured to determine a delay value between the first audio signal and the second audio signal; and perform, after the first audio signal and the second audio signal are synchronized according to the delay value, the step of determining a frequency response gain value of the receiving device according to a power spectrum of the first audio signal and a power spectrum of the second audio signal.

In an embodiment, the receiving device is further configured to obtain a first power spectrum and a second power spectrum, the first power spectrum including a power spectrum of a current frame of first audio signal and a power spectrum of more than one frame of first audio signal before the current frame of first audio signal, and the second power spectrum including a power spectrum of a current frame of second audio signal; perform an XOR accumulation operation according to the first power spectrum and the second power spectrum, to obtain candidate delay values; and select an echo delay value between the first audio signal and the second audio signal from the candidate delay values.

In an embodiment, the receiving device is further configured to obtain a first binarization array corresponding to the first audio signal according to the first power spectrum and smoothing values of frequency points in the first power spectrum; obtain a second binarization array corresponding to the second audio signal according to the second power spectrum and smoothing values of frequency points in the second power spectrum; and perform the XOR accumulation operation according to the first binarization array and the second binarization array, to obtain the candidate delay values.

In an embodiment, the receiving device is further configured to determine a frequency response gain value of the receiving device on each synchronized audio frame sequentially from the first synchronized audio frame of the first audio signal and the second audio signal according to the power spectrum of the first audio signal and the power spectrum of the second audio signal; and determine the playback frequency band upper limit value of the receiving device according to the initial sampling rate and a frequency response gain value of the receiving device on a current synchronized audio frame when a quantity of synchronized audio frames reaches a preset quantity of frames.

In an embodiment, the receiving device is further configured to use each synchronized audio frame sequentially from the first synchronized audio frame of the first audio signal and the second audio signal as the current synchronized audio frame; use a frequency response gain value of a previous synchronized audio frame of the current synchronized audio frame as the frequency response gain value of the current synchronized audio frame when a power spectrum value of the current synchronized audio frame of the first audio signal does not exceed a preset power spectrum value; and calculate the frequency response gain value of the current synchronized audio frame according to a frequency response gain value of a previous synchronized audio frame of the current synchronized audio frame and a ratio of the power spectrum value of the first audio signal to a power spectrum value of the second audio signal on the current synchronized audio frame when the power spectrum value of the current synchronized audio frame of the first audio signal exceeds the preset power spectrum value.

In an embodiment, the receiving device is further configured to determine an upper boundary value and a lower boundary value of a test frequency range based on the initial sampling rate; determine, in the test frequency range, a target frequency used as the playback frequency band upper limit value of the receiving device, an average power spectrum in a range from the lower boundary value to the target frequency being less than an average power spectrum in a range from the target frequency to the upper boundary value, and the frequency response gain value being used for calculating the average power spectrum; and generate the target sampling rate of the transmitting device according to the playback frequency band upper limit value.

In an embodiment, the receiving device is further configured to obtain the first audio signal recorded and encoded by the transmitting device; obtain the second audio signal recorded by the receiving device during decoding and playing of the first audio signal; and determine the frequency response gain value of the receiving device according to the power spectrum of the decoded first audio signal and the power spectrum of the second audio signal.

In the foregoing sampling rate processing system, from the perspective of acoustic capability matching from the transmitting device to the receiving device, frequency spectrum analysis is performed based on the first audio signal recorded by the transmitting device and the second audio signal obtained by the receiving device recording the first audio signal, and the target sampling rate matching with the playback capability of the receiving device is determined. The first audio signal and the second audio signal are recorded according to the initial sampling rate, and the target sampling rate matching the actual playback capability of the receiving device is determined based on the initial sampling rate and the frequency response gain value of the receiving device. In this way, when the target sampling rate is used for language sampling of a voice call between the transmitting device and the receiving device, not only calculation processing resources, storage resources, and network transmission resources of the transmitting device can be effectively used, but also the playback effect of the receiving device can be improved, thereby avoiding distortion.

In an embodiment, the sampling rate processing system further includes a server, and data transmission between the transmitting device and the receiving device may be transferred through the server. For example, the transmitting device transmits the first audio signal to the server, and then the server forwards the first audio signal to the receiving device. In another example, the receiving device transmits the playback frequency band upper limit value to the server, and then the server forwards the playback frequency band upper limit value to the transmitting device.

Figure 5:
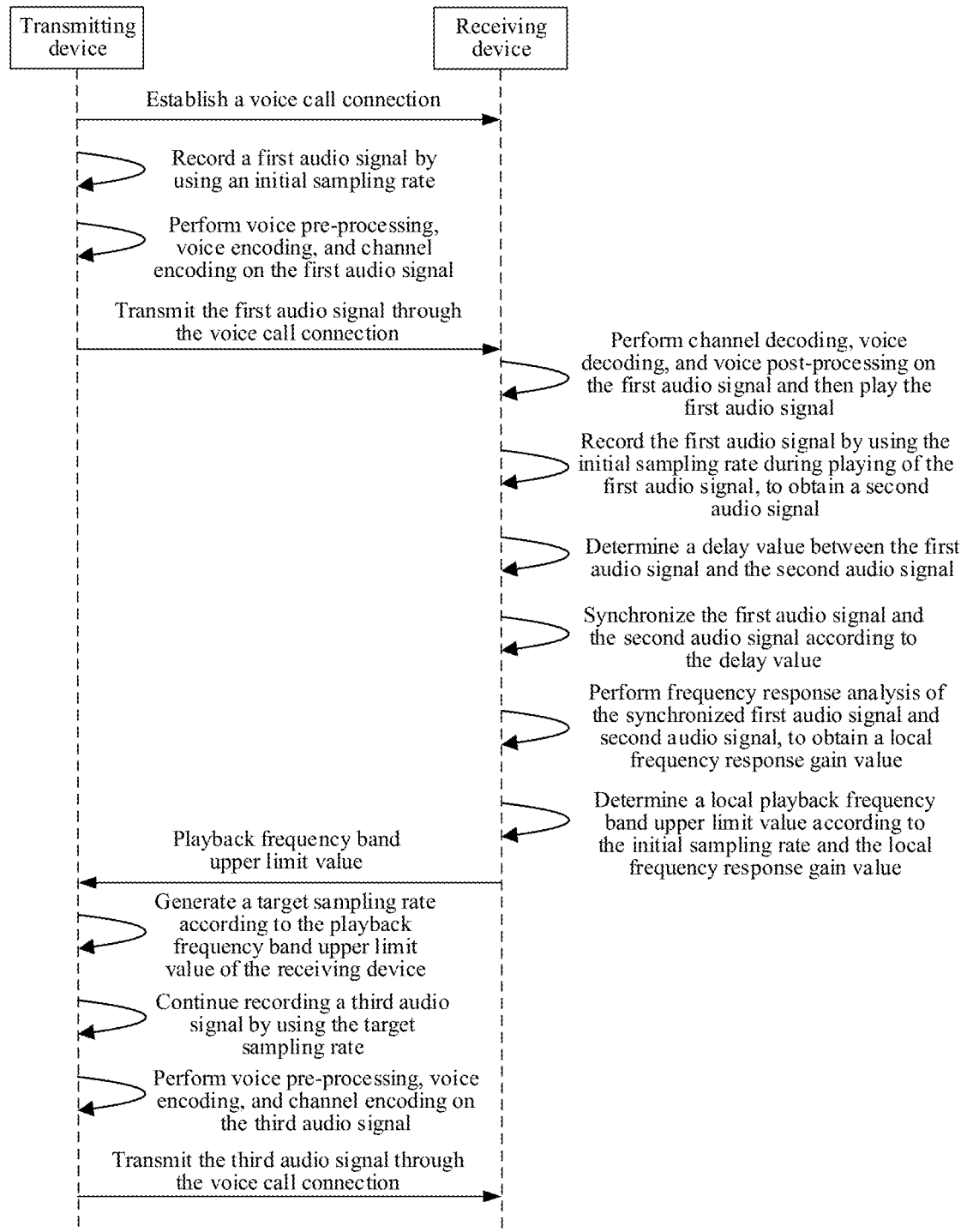
FIG. 5 is a sequence diagram of a sampling rate processing method according to an embodiment.

As shown in FIG. 5, in a specific embodiment, a sequence diagram of a processing method applied to the sampling rate processing system is as follows:

501: A transmitting device establishes a voice call connection to a receiving device.

502: The transmitting device records a first audio signal by using an initial sampling rate, and transmits, after performing voice pre-processing, voice encoding, and channel encoding on the first audio signal, the first audio signal to the receiving device through the voice call connection.

503: After receiving the first audio signal, the receiving device performs channel decoding, voice decoding, and voice post-processing on the first audio signal and then plays the first audio signal.

504: The receiving device records the first audio signal by using the initial sampling rate during playing of the first audio signal, to obtain a second audio signal.

505: The receiving device determines a delay value between the first audio signal and the second audio signal.

506: The receiving device synchronizes the first audio signal and the second audio signal according to the delay value.

507: The receiving device performs frequency response analysis on the synchronized first audio signal and second audio signal, to obtain a local frequency response gain value.

508: The receiving device determines a local playback frequency band upper limit value according to the initial sampling rate and the local frequency response gain value.

509: The receiving device feeds back the local playback frequency band upper limit value to the transmitting device.

510: The transmitting device generates a target sampling rate according to the playback frequency band upper limit value of the receiving device.

511: The transmitting device continues recording a third audio signal by using the target sampling rate, and transmits, after performing voice pre-processing, voice encoding, and channel encoding on the third audio signal, the third audio signal to the receiving device through the voice call connection.

512: The receiving device performs channel decoding, voice decoding, and voice post-processing on the received third audio signal and then plays the third audio signal.

The transmitting device may obtain the first (third) audio signal by a microphone recording call voice of a speaker. The first (third) audio signal transmitted by the transmitting device is an audio signal on which voice pre-processing, voice encoding, and channel encoding have been performed. The first (third) audio signal played by the receiving device is an audio signal on which channel decoding, voice decoding, and voice post-processing have been performed. The first (third) audio signal of which the receiving device calculates a delay value, performs synchronization, and performs frequency response analysis is the first (third) audio signal on which channel decoding and voice decoding have been performed. For the determining of the delay value, the frequency response analysis, and the determining of the playback frequency band upper limit value of the playback device, reference may be made to the foregoing embodiments. Audio signal transmission between the transmitting device and the receiving device may be transferred through the server.

It may be understood that, when an acoustic playback capability of the receiving device is unknown, the transmitting device usually sets an initial audio sampling rate according to a playback capability of the transmitting device, such as a sampling rate of 48 kHz. However, actually, the receiving device may only support a playback capability with a lower sampling rate such as 16 kHz. Therefore, there are two common playback performances: 1) A playback device uses the sampling rate of 48 kHz for processing, but signal energy of a frequency response of a final voice actually played in a frequency range of 8 kHz-24 kHz (a signal frequency bandwidth is half of a sampling frequency rate according to Shannon's sampling theorem) is almost zero, that is, a high frequency of this part has no actual output; 2) The playback device sets a voice processing sampling rate value of the playback device, for example, to 16 kHz. Therefore, the playback device performs signal processing after the sampling rate of 48 kHz of the signal on which voice decoding has been performed is forcibly reduced to 16 kHz, and the final audio signal reaching the playback device has only the sampling rate of 16 kHz. Consequently, calculation processing resources and storage resources are wasted. Moreover, because a high sampling rate causes an increase of a transmission bandwidth, transmission quality in high bandwidth occupancy may be affected by bandwidth competition of an actual network, resulting in a decrease in voice quality of a call.

In the embodiments of this application, from the perspective of acoustic capability matching from the transmitting device to the receiving device, frequency response analysis is performed based on the first audio signal recorded by the transmitting device and the second audio signal obtained by the receiving device recording the first audio signal, and the playback frequency band upper limit value of the receiving device is determined. The first audio signal and the second audio signal are recorded according to the initial sampling rate, and an upper limit value of a frequency band that the receiving device can effectively and actually play is determined based on the initial sampling rate. In this way, the target sampling rate of the transmitting device generated based on the playback frequency band upper limit value matches the actual playback capability of the receiving device. When the target sampling rate is used for language sampling of a voice call between the transmitting device and the receiving device, not only calculation processing resources, storage resources, and network transmission resources of the transmitting device can be effectively used, but also the playback effect of the receiving device can be improved, thereby avoiding distortion It is to be understood that, although the steps are displayed sequentially according to the instructions of the arrows in the flowcharts of the embodiments, these steps are not necessarily performed sequentially according to the sequence instructed by the arrows. Unless otherwise explicitly specified in this application, execution of the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed alternately with other steps or at least some of sub-steps or stages of other steps.

Figure 6:
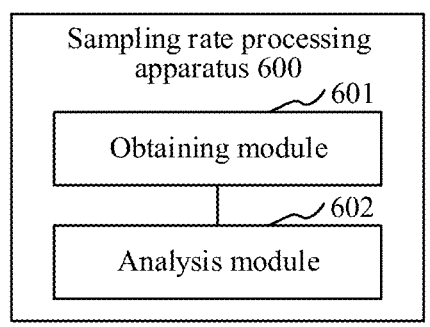
FIG. 6 is a structural block diagram of a sampling rate processing apparatus according to an embodiment.

As shown in FIG. 6, in an embodiment, a sampling rate processing apparatus 600 is provided. Referring to FIG. 6, the sampling rate processing apparatus 600 includes: an obtaining module 601 and an analysis module 602. All or some of the modules included in the sampling rate processing apparatus may be implemented by software, hardware, or a combination thereof.

The obtaining module 601 is configured to obtain a first audio signal recorded by a transmitting device, the first audio signal being recorded according to an initial sampling rate of the transmitting device; and obtain a second audio signal recorded by a receiving device during playing of the first audio signal, the second audio signal being recorded according to the initial sampling rate.

The analysis module 602 is configured to determine a frequency response gain value of the receiving device according to a power spectrum of the first audio signal and a power spectrum of the second audio signal; and determine a target sampling rate of the transmitting device according to the initial sampling rate and the frequency response gain value. In some embodiments, the transmitting device is configured to record audio signals according to the target sampling rate.

Figure 7:
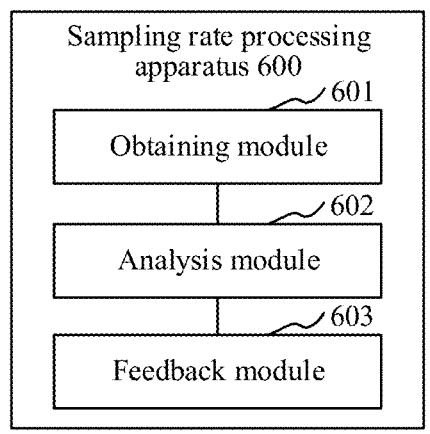
FIG. 7 is a structural block diagram of a sampling rate processing apparatus according to another embodiment.

As shown in FIG. 7, in an embodiment, the obtaining module 601 is further configured to obtain the first audio signal transmitted through a communication connection. The analysis module 602 is further configured to determine a playback frequency band upper limit value of the receiving device according to the initial sampling rate and the frequency response gain value; and generate the target sampling rate of the transmitting device according to the playback frequency band upper limit value. The sampling rate processing apparatus 600 further includes: a feedback module 603, configured to continue recording a third audio signal and continue transmitting the third audio signal through the communication connection after a sampling rate of recording an audio signal is adjusted from the initial sampling rate to the target sampling rate.

In an embodiment, the analysis module 602 is further configured to determine a delay value between the first audio signal and the second audio signal; and determine the frequency response gain value of the receiving device according to the power spectrum of the first audio signal and the power spectrum of the second audio signal after the first audio signal and the second audio signal are synchronized according to the delay value.

first audio signal and the second audio signal according to the power spectrum of the first audio signal and the power spectrum of the second audio signal; and determine the playback frequency band upper limit value of the receiving device according to the initial sampling rate and a frequency response gain value of the receiving device on a current synchronized audio frame when a quantity of synchronized audio frames reaches a preset quantity of frames.

In an embodiment, the analysis module 602 is further configured to use each synchronized audio frame as the current synchronized audio frame from the first synchronized audio frame of the first audio signal and the second audio signal sequentially; use a frequency response gain value of a previous synchronized audio frame of the current synchronized audio frame as the frequency response gain value of the current synchronized audio frame when a power spectrum value of the current synchronized audio frame of the first audio signal does not exceed a preset power spectrum value; and calculate the frequency response gain value of the current synchronized audio frame according to a frequency response gain value of a previous synchronized audio frame of the current synchronized audio frame and a ratio of the power spectrum value of the first audio signal to a power spectrum value of the second audio signal on the current synchronized audio frame when the power spectrum value of the current synchronized audio frame of the first audio signal exceeds the preset power spectrum value.

In an embodiment, the analysis module 602 is further configured to obtain a frequency response gain value of the receiving device on a $j^{th}$ synchronized audio frame through calculation according to the following formula:

$$Fr(j,k) = \begin{cases} 0.9*Fr(j-1,k) + 0.1*\dfrac{S_{cap}(j,k)}{S_{ref}(j,k)} & if\left(S_{ref}(j,k) > S_0 \&\& 5*Fr(j-1,k) < \dfrac{S_{cap}(j,k)}{S_{ref}(j,k)}\right) \\ 0.995*Fr(j-1,k) + 0.005*\dfrac{S_{cap}(j,k)}{S_{ref}(j,k)} & if\left(S_{ref}(j,k) > S_0 \&\& 5*Fr(j-1,k) \geq \dfrac{S_{cap}(j,k)}{S_{ref}(j,k)}\right) \\ Fr(j-1,k) & if\ (S_{ref}(j,k) \leq S_0) \end{cases}$$

In an embodiment, the analysis module 602 is further configured to obtain a first power spectrum and a second power spectrum, the first power spectrum including a power spectrum of a current frame of first audio signal and a power spectrum of more than one frame of first audio signal before the current frame of first audio signal, and the second power spectrum including a power spectrum of a current frame of second audio signal; perform an XOR accumulation operation according to the first power spectrum and the second power spectrum, to obtain candidate delay values; and select an echo delay value between the first audio signal and the second audio signal from the candidate delay values.

In an embodiment, the analysis module 602 is further configured to obtain a first binarization array corresponding to the first audio signal according to the first power spectrum and smoothing values of frequency points in the first power spectrum; obtain a second binarization array corresponding to the second audio signal according to the second power spectrum and smoothing values of frequency points in the second power spectrum; and perform the XOR accumulation operation according to the first binarization array and the second binarization array, to obtain the candidate delay values.

In an embodiment, the analysis module 602 is further configured to determine a frequency response gain value of the receiving device on each synchronized audio frame sequentially from the first synchronized audio frame of the where j is a frame number of an audio frame, k is a frequency point number, $S_{cap}(j,k)$ is a power spectrum value of a $k^{th}$ frequency point of a $j^{th}$ frame in the first audio signal, $S_{ref}(j,k)$ is a power spectrum value of a $k^{th}$ frequency point of a $j^{th}$ frame in the second audio signal, and $S_0$ is a constant.

In an embodiment, the analysis module 602 is further configured to determine an upper boundary value and a lower boundary value of a test frequency range based on the initial sampling rate; determine, in the test frequency range, a target frequency used as the playback frequency band upper limit value of the receiving device, an average power spectrum in a range from the lower boundary value to the target frequency being less than an average power spectrum in a range from the target frequency to the upper boundary value, and the frequency response gain value being used for calculating the average power spectrum; and generate the target sampling rate of the transmitting device according to the playback frequency band upper limit value.

In an embodiment, the obtaining module 601 is further configured to obtain the first audio signal recorded and encoded by the transmitting device; and obtain the second audio signal recorded by the receiving device during decoding and playing of the first audio signal. The analysis module 602 is further configured to determine the frequency response gain value of the receiving device according to the power spectrum of the decoded first audio signal and the power spectrum of the second audio signal.

The sampling rate processing apparatus performs, from the perspective of acoustic capability matching from the transmitting device to the receiving device, frequency spectrum analysis based on the first audio signal recorded by the transmitting device and the second audio signal obtained by the receiving device recording the first audio signal, and determines the playback frequency band upper limit value of the receiving device. The first audio signal and the second audio signal are recorded according to the initial sampling rate, and an upper limit value of a frequency band that the receiving device can effectively and actually play is determined based on the initial sampling rate. In this way, when the target sampling rate of the transmitting device generated based on the playback frequency band upper limit value is used for language sampling of a voice call between the transmitting device and the receiving device, not only calculation processing resources, storage resources, and network transmission resources of the transmitting device can be effectively used, but also the playback effect of the receiving device can be improved, thereby avoiding distortion.

Figure 8:
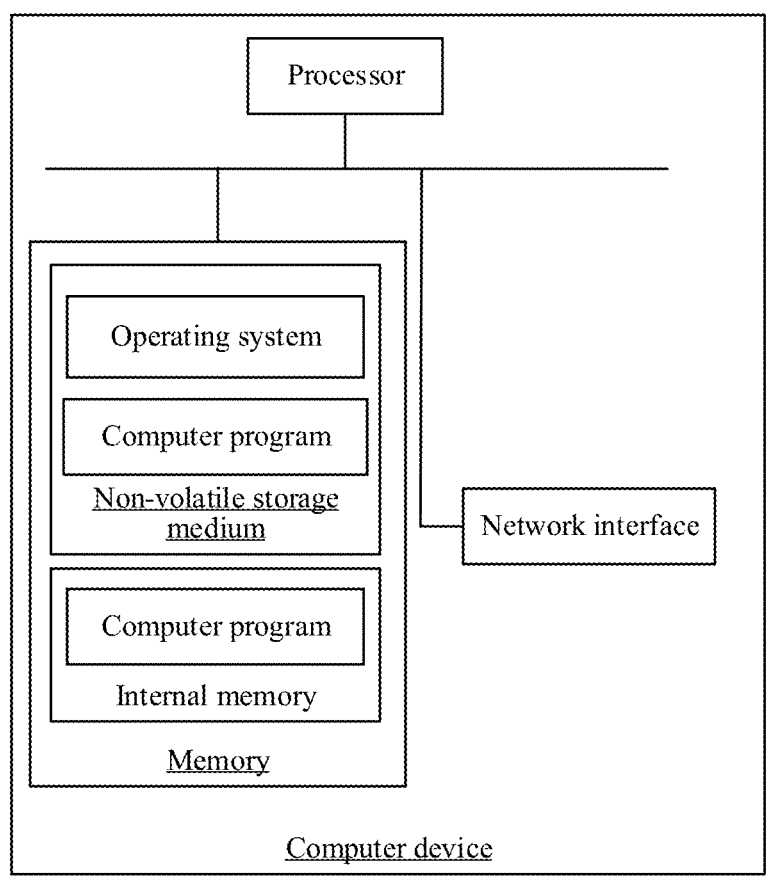
FIG. 8 is a structural block diagram of a computer device according to an embodiment.

FIG. 8 is a diagram of an internal structure of a computer device according to an embodiment. The computer device may be specifically the terminal 110 (or the server 120) in FIG. 1. As shown in FIG. 8, the computer device includes a processor, a memory, a network interface, an input apparatus, and a display screen that are connected through a system bus. The memory includes a non-transitory computer-readable storage medium and an internal memory. The non-transitory computer-readable storage medium of the computer device stores an operating system and may further store a computer program. The computer program, when executed by the processor, may cause the processor to perform the sampling rate processing method. The internal memory may also store a computer program. The computer program, when executed by the processor, may cause the processor to perform the sampling rate processing method. A person skilled in the art may understand that the structure shown in FIG. 8 is only a block diagram of a partial structure related to the solution of this application, and does not constitute a limitation to the computer device to which the solution of this application is applied. Specifically, the computer device may include more or fewer components than those shown in the figure, or some components may be combined, or a different component deployment is used.

In other embodiments, when the computer device is the terminal 110 in FIG. 1, the computer device may further include a sound acquisition apparatus, such as a microphone; and a sound playback apparatus, such as a loudspeaker.

In an embodiment, the sampling rate processing apparatus provided in this application may be implemented in a form of a computer program, and the computer program may be run on the computer device shown in FIG. 8. The memory of the computer device may store program modules forming the sampling rate processing apparatus, for example, the obtaining module 601 and the analysis module 602 shown in FIG. 6. A computer program formed by the program modules causes the processor to perform the steps in the sampling rate processing method in the embodiments of this application described in this specification.

For example, the computer device shown in FIG. 8 may perform, by using the obtaining module 601 in the sampling rate processing apparatus shown in FIG. 6, the step of obtaining a first audio signal recorded by a transmitting device, the first audio signal being recorded according to an initial sampling rate of the transmitting device, and the step of obtaining a second audio signal recorded by a receiving device during playing of the first audio signal, the second audio signal being recorded according to the initial sampling rate. The computer device may perform, by using the analysis module 602, the step of determining a frequency response gain value of the receiving device according to a power spectrum of the first audio signal and a power spectrum of the second audio signal, and the step of determining a playback frequency band upper limit value of the receiving device according to the initial sampling rate and the frequency response gain value, the playback frequency band upper limit value being used for generating the target sampling rate of the transmitting device.

In an embodiment, a computer device is provided, including a memory and a processor, the memory storing a computer program, the computer program, when executed by the processor, causing the processor to perform the steps in the foregoing sampling rate processing method. The steps in the sampling rate processing method herein may be the steps in the sampling rate processing method in the foregoing embodiments.

In an embodiment, a computer-readable storage medium is provided, storing a computer program, the computer program, when executed by a processor, causing the processor to perform the steps in the foregoing sampling rate processing method. The steps in the sampling rate processing method herein may be the steps in the sampling rate processing method in the foregoing embodiments.

In an embodiment, a computer program product or a computer program is provided. The computer program product or the computer program includes computer instructions, the computer instructions being stored in a computer-readable storage medium. The processor of the computer device reads the computer instructions from the computer-readable storage medium, and the processor executes the computer instructions, to cause the computer device to perform the steps in the foregoing method embodiments.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. References to the memory, the storage, the database, or other medium used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a RAM or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink (Synchlink) DRAM (SLDRAM), a Rambus (Rambus) direct RAM (RDRAM), a direct Rambus dynamic RAM (DRDRAM), and a Rambus dynamic RAM (RDRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The foregoing embodiments show only several implementations of this application and are described in detail, which, however, are not to be construed as a limitation to the patent scope of this application. It should be noted that for a person of ordinary skill in the art, several transforms and improvements can be made without departing from the idea of this application. These transforms and improvements belong to the protection scope of this application. Therefore, the protection scope of the patent of this application shall be subject to the appended claims.

What is claimed is:

1. A sampling rate processing method performed by a computer device, the method comprising:
    obtaining a first audio signal recorded by a transmitting device, the first audio signal being recorded according to an initial sampling rate of the transmitting device;
    obtaining a second audio signal recorded by a receiving device during playing of the first audio signal, the second audio signal being recorded according to the initial sampling rate;
    determining a frequency response gain value of the receiving device according to a power spectrum of the first audio signal and a power spectrum of the second audio signal;
    determining a target sampling rate of the transmitting device according to the initial sampling rate and the frequency response gain value; and
    configuring the transmitting device to record audio signals according to the target sampling rate.

2. The method according to claim 1, wherein the obtaining a first audio signal recorded by a transmitting device comprises:
    obtaining the first audio signal transmitted through a communication connection;
    the determining a target sampling rate of the transmitting device according to the initial sampling rate and the frequency response gain value comprises:
    determining a playback frequency band upper limit value of the receiving device according to the initial sampling rate and the frequency response gain value; and
    generating the target sampling rate of the transmitting device according to the playback frequency band upper limit value; and
    the configuring the transmitting device to record audio signals according to the target sampling rate comprises:
    continuing recording a third audio signal and continuing transmitting the third audio signal through the communication connection after a sampling rate of recording an audio signal is adjusted from the initial sampling rate to the target sampling rate.

3. The method according to claim 1, further comprising: determining a delay value between the first audio signal and the second audio signal; and
    performing, after the first audio signal and the second audio signal are synchronized according to the delay value, the operation of determining a frequency response gain value of the receiving device according to a power spectrum of the first audio signal and a power spectrum of the second audio signal.

4. The method according to claim 3, wherein the determining a delay value between the first audio signal and the second audio signal comprises:
    obtaining a first power spectrum and a second power spectrum, the first power spectrum comprising a power spectrum of a current frame of first audio signal and a power spectrum of more than one frame of first audio signal before the current frame of first audio signal, and the second power spectrum comprising a power spectrum of a current frame of second audio signal;
    performing an XOR accumulation operation according to the first power spectrum and the second power spectrum, to obtain candidate delay values; and
    selecting an echo delay value between the first audio signal and the second audio signal from the candidate delay values.

5. The method according to claim 4, wherein the performing an XOR accumulation operation according to the first power spectrum and the second power spectrum, to obtain candidate delay values comprises:
    obtaining a first binarization array corresponding to the first audio signal according to the first power spectrum and smoothing values of frequency points in the first power spectrum;
    obtaining a second binarization array corresponding to the second audio signal according to the second power spectrum and smoothing values of frequency points in the second power spectrum; and
    performing the XOR accumulation operation according to the first binarization array and the second binarization array, to obtain the candidate delay values.

6. The method according to claim 3, wherein the determining a frequency response gain value of the receiving device according to a power spectrum of the first audio signal and a power spectrum of the second audio signal comprises:
    determining the frequency response gain value of the receiving device on each synchronized audio frame sequentially from the first synchronized audio frame of the first audio signal and the second audio signal according to the power spectrum of the first audio signal and the power spectrum of the second audio signal; and
    when a quantity of synchronized audio frames reaches a preset quantity of frames, the determining a playback frequency band upper limit value of the receiving device according to the initial sampling rate and the frequency response gain value comprises:
    determining the playback frequency band upper limit value of the receiving device according to the initial sampling rate and a frequency response gain value of the receiving device on a current synchronized audio frame.

7. The method according to claim 6, wherein the determining the frequency response gain value of the receiving device on each synchronized audio frame sequentially from the first synchronized audio frame of the first audio signal and the second audio signal according to the power spectrum of the first audio signal and the power spectrum of the second audio signal comprises:

using each synchronized audio frame as the current synchronized audio frame from the first synchronized audio frame of the first audio signal and the second audio signal sequentially;

using a frequency response gain value of a previous synchronized audio frame of the current synchronized audio frame as the frequency response gain value of the current synchronized audio frame when a power spectrum value of the current synchronized audio frame of the first audio signal does not exceed a preset power spectrum value; and calculating the frequency response gain value of the current synchronized audio frame according to a frequency response gain value of a previous synchronized audio frame of the current synchronized audio frame and a ratio of the power spectrum value of the first audio signal to a power spectrum value of the second audio signal on the current synchronized audio frame when the power spectrum value of the current synchronized audio frame of the first audio signal exceeds the preset power spectrum value.

8. The method according to claim 6, wherein a frequency response gain value of the receiving device on a $j^{th}$ synchronized audio frame is obtained through calculation according to the following formula:

$$Fr(j,k) = \begin{cases} 0.9*Fr(j-1,k) + 0.1*\dfrac{S_{cap}(j,k)}{S_{ref}(j,k)} & f\left(S_{ref}(j,k) > S_0 \text{ \&\& } 5*Fr(j-1,k) < \dfrac{S_{cap}(j,k)}{S_{ref}(j,k)}\right) \\ 0.995*Fr(j-1,k) + 0.005*\dfrac{S_{cap}(j,k)}{S_{ref}(j,k)} & if\left(S_{ref}(j,k) > S_0 \text{ \&\& } 5*Fr(j-1,k) \geq \dfrac{S_{cap}(j,k)}{S_{ref}(j,k)}\right), \\ Fr(j-1,k) & if\ (S_{ref}(j,k) \leq S_0) \end{cases}$$

wherein j is a frame number of an audio frame, k is a frequency point number, $S_{cap}(j, k)$ is a power spectrum value of a $k^{th}$ frequency point of a $j^{th}$ frame in the first audio signal, $S_{ref}(j, k)$ is a power spectrum value of a $k^{th}$ frequency point of a $j^{th}$ frame in the second audio signal, and $S_0$ is a constant.

9. The method according to claim 1, wherein the determining a target sampling rate of the transmitting device according to the initial sampling rate and the frequency response gain value comprises:

determining an upper boundary value and a lower boundary value of a test frequency range based on the initial sampling rate;

determining, in the test frequency range, a target frequency used as a playback frequency band upper limit value of the receiving device, an average power spectrum in a range from the lower boundary value to the target frequency being less than an average power spectrum in a range from the target frequency to the upper boundary value, and the frequency response gain value being used for calculating the average power spectrum; and generating the target sampling rate of the transmitting device according to the playback frequency band upper limit value.

10. The method according to claim 1, wherein the obtaining a first audio signal recorded by a transmitting device comprises:

obtaining the first audio signal recorded and encoded by the transmitting device;

the obtaining a second audio signal recorded by a receiving device during playing of the first audio signal comprises:

obtaining the second audio signal recorded by the receiving device during decoding and playing of the first audio signal; and the determining a frequency response gain value of the receiving device according to a power spectrum of the first audio signal and a power spectrum of the second audio signal comprises:

determining the frequency response gain value of the receiving device according to the power spectrum of the decoded first audio signal and the power spectrum of the second audio signal.

11. A computer device, comprising a memory and a processor, the memory storing computer-readable instructions, the computer-readable instructions, when executed by the processor, causing the computer device to perform a plurality of operations including:

obtaining a first audio signal recorded by a transmitting device, the first audio signal being recorded according to an initial sampling rate of the transmitting device;

obtaining a second audio signal recorded by a receiving device during playing of the first audio signal, the second audio signal being recorded according to the initial sampling rate;

determining a frequency response gain value of the receiving device according to a power spectrum of the first audio signal and a power spectrum of the second audio signal;

determining a target sampling rate of the transmitting device according to the initial sampling rate and the frequency response gain value; and configuring the transmitting device to record audio signals according to the target sampling rate.

12. The computer device according to claim 11, wherein the obtaining a first audio signal recorded by a transmitting device comprises:

obtaining the first audio signal transmitted through a communication connection;

the determining a target sampling rate of the transmitting device according to the initial sampling rate and the frequency response gain value comprises:

determining a playback frequency band upper limit value of the receiving device according to the initial sampling rate and the frequency response gain value; and generating the target sampling rate of the transmitting device according to the playback frequency band upper limit value; and the configuring the transmitting device to record audio signals according to the target sampling rate comprises:

continuing recording a third audio signal and continuing transmitting the third audio signal through the communication connection after a sampling rate of recording an audio signal is adjusted from the initial sampling rate to the target sampling rate.

13. The computer device according to claim 11, wherein the plurality of operations further comprise:

determining a delay value between the first audio signal and the second audio signal; and performing, after the first audio signal and the second audio signal are synchronized according to the delay value, the operation of determining a frequency response gain value of the receiving device according to a power spectrum of the first audio signal and a power spectrum of the second audio signal.

14. The computer device according to claim 13, wherein the determining a delay value between the first audio signal and the second audio signal comprises:

obtaining a first power spectrum and a second power spectrum, the first power spectrum comprising a power spectrum of a current frame of first audio signal and a power spectrum of more than one frame of first audio signal before the current frame of first audio signal, and the second power spectrum comprising a power spectrum of a current frame of second audio signal;

performing an XOR accumulation operation according to the first power spectrum and the second power spectrum, to obtain candidate delay values; and selecting an echo delay value between the first audio signal and the second audio signal from the candidate delay values.

15. The computer device according to claim 14, wherein the performing an XOR accumulation operation according to the first power spectrum and the second power spectrum, to obtain candidate delay values comprises:

obtaining a first binarization array corresponding to the first audio signal according to the first power spectrum and smoothing values of frequency points in the first power spectrum;

obtaining a second binarization array corresponding to the second audio signal according to the second power spectrum and smoothing values of frequency points in the second power spectrum; and performing the XOR accumulation operation according to the first binarization array and the second binarization array, to obtain the candidate delay values.

16. The computer device according to claim 13, wherein the determining a frequency response gain value of the receiving device according to a power spectrum of the first audio signal and a power spectrum of the second audio signal comprises:

determining the frequency response gain value of the receiving device on each synchronized audio frame sequentially from the first synchronized audio frame of the first audio signal and the second audio signal according to the power spectrum of the first audio signal and the power spectrum of the second audio signal; and when a quantity of synchronized audio frames reaches a preset quantity of frames, the determining a playback frequency band upper limit value of the receiving device according to the initial sampling rate and the frequency response gain value comprises:

determining the playback frequency band upper limit value of the receiving device according to the initial sampling rate and a frequency response gain value of the receiving device on a current synchronized audio frame.

17. The computer device according to claim 11, wherein the determining a target sampling rate of the transmitting device according to the initial sampling rate and the frequency response gain value comprises:

determining an upper boundary value and a lower boundary value of a test frequency range based on the initial sampling rate;

determining, in the test frequency range, a target frequency used as a playback frequency band upper limit value of the receiving device, an average power spectrum in a range from the lower boundary value to the target frequency being less than an average power spectrum in a range from the target frequency to the upper boundary value, and the frequency response gain value being used for calculating the average power spectrum; and generating the target sampling rate of the transmitting device according to the playback frequency band upper limit value.

18. The computer device according to claim 11, wherein the obtaining a first audio signal recorded by a transmitting device comprises:

obtaining the first audio signal recorded and encoded by the transmitting device;

the obtaining a second audio signal recorded by a receiving device during playing of the first audio signal comprises:

obtaining the second audio signal recorded by the receiving device during decoding and playing of the first audio signal; and the determining a frequency response gain value of the receiving device according to a power spectrum of the first audio signal and a power spectrum of the second audio signal comprises:

determining the frequency response gain value of the receiving device according to the power spectrum of the decoded first audio signal and the power spectrum of the second audio signal.

19. A non-transitory computer-readable storage medium storing computer-readable instructions, the computer-readable instructions, when executed by a processor of a computer device, causing the computer device to perform a plurality of operations including:

obtaining a first audio signal recorded by a transmitting device, the first audio signal being recorded according to an initial sampling rate of the transmitting device;

obtaining a second audio signal recorded by a receiving device during playing of the first audio signal, the second audio signal being recorded according to the initial sampling rate;

determining a frequency response gain value of the receiving device according to a power spectrum of the first audio signal and a power spectrum of the second audio signal;

determining a target sampling rate of the transmitting device according to the initial sampling rate and the frequency response gain value; and configuring the transmitting device to record audio signals according to the target sampling rate.

20. The non-transitory computer-readable storage medium according to claim 19, wherein the obtaining a first audio signal recorded by a transmitting device comprises:

obtaining the first audio signal transmitted through a communication connection;

the determining a target sampling rate of the transmitting device according to the initial sampling rate and the frequency response gain value comprises:

determining a playback frequency band upper limit value of the receiving device according to the initial sampling rate and the frequency response gain value; and generating the target sampling rate of the transmitting device according to the playback frequency band upper limit value; and the configuring the transmitting device to record audio signals according to the target sampling rate comprises:

continuing recording a third audio signal and continuing transmitting the third audio signal through the communication connection after a sampling rate of recording an audio signal is adjusted from the initial sampling rate to the target sampling rate.

* * * * *